(12) United States Patent
Pertile et al.

(10) Patent No.: US 7,303,688 B2
(45) Date of Patent: Dec. 4, 2007

(54) OIL SKIMMER AND METHOD OF OPERATING SAME

(75) Inventors: Lawrence Pertile, North Vancouver (CA); Cameron Stewart Janz, North Vancouver (CA)

(73) Assignee: Aqua-Guard Spill Response Inc.

( * ) Notice: Subject to any disclaimer, the term of this patent is extended or adjusted under 35 U.S.C. 154(b) by 31 days.

(21) Appl. No.: 11/286,139

(22) Filed: Nov. 23, 2005

(65) Prior Publication Data

US 2007/0114189 A1    May 24, 2007

(51) Int. Cl.
*E02B 15/04* (2006.01)

(52) U.S. Cl. .................. 210/776; 210/242.3; 210/923
(58) Field of Classification Search ........... 210/776, 210/923, 242.1, 242.3, 242.4, 924
See application file for complete search history.

(56) References Cited

U.S. PATENT DOCUMENTS

| | | | | |
|---|---|---|---|---|
| 3,426,902 | A * | 2/1969 | Bauer et al. ................ | 210/776 |
| 3,539,508 | A * | 11/1970 | Bulkley et al. ........... | 210/242.4 |
| 3,612,277 | A * | 10/1971 | Van Stavern et al. ....... | 210/776 |
| 3,617,555 | A * | 11/1971 | Ginsburgh et al. ........ | 210/242.4 |
| 3,670,896 | A * | 6/1972 | Hale et al. ................ | 210/242.3 |
| 4,061,569 | A * | 12/1977 | Bennett et al. ............. | 210/923 |
| 4,363,735 | A * | 12/1982 | Hook .......................... | 210/776 |
| 4,368,122 | A * | 1/1983 | Ravagnan ................ | 210/242.3 |
| 4,514,299 | A * | 4/1985 | Ayroldi ...................... | 210/923 |
| 5,085,770 | A * | 2/1992 | Eberhardt ................ | 210/242.3 |
| 5,173,182 | A * | 12/1992 | Debellian ................ | 210/242.3 |

\* cited by examiner

*Primary Examiner*—Christopher Upton
(74) *Attorney, Agent, or Firm*—John Russell Uren

(57) ABSTRACT

A skimmer used to remove both heavy and light oil from a body of water or for the removal of either light or heavy oil and a method of operation of the skimmer. The heavier oil is removed from a first location on a rotating member and the lighter oil is removed from a second location on the rotating member. The oil removed at both locations is collected at a single location and a pump removes the oil from the skimmer.

23 Claims, 6 Drawing Sheets

FIG. IC

OIL SKIMMER AND METHOD OF OPERATING SAME

This invention relates to a method and apparatus for removing oil from water using an oil skimmer and, more particularly, to a method and apparatus for removing oil from water with the oil skimmer regardless of whether the oil within the water is of different viscosities consisting of relatively heavier oil and relatively lighter oil or of a single viscosity.

BACKGROUND OF THE INVENTION

Oil originating from pipelines, ships, wells, railroads, trucks and the like often is spilled due to accidents and is introduced into the environment. Such spills may occur in or adjacent to bodies of water such as lakes, oceans, streams and rivers. The potential for environmental damage is great and it is advantageous to remove the spilled oil from the water as soon as possible to prevent its dispersion to greater areas and to minimize the damage to life forms which depend on uncontaminated water.

Typically, oil skimmers are used to remove the oil in bodies of water caused by contamination. Such skimmers are usually maintained in storage locations where they can quickly be deployed to the accident area and introduced into the water so as to quickly remove the oil from the contaminated water.

The oil which is accidentally introduced to bodies of water may be oil of a single or uniform consistency or it may comprise relatively lighter and relatively heavier consistencies. The oil of lighter consistency generally flows well and the removal of such oil from the water proceeds without undue difficulty using presently available technology. Typically, such light oil is removed by a revolving brush or other rotating member which comes into contact with the light oil and to which the light oil adheres. The member is rotated past a scraper or other oil removal device which contacts the member and thereby mechanically removes the adhered oil. The oil removed falls into a collecting trough where it is subsequently pumped to a storage location.

Where oil of relatively heavier consistency is also introduced to the water, problems arise in removing both the heavier oil and the light oil. The heavier oil does not flow well and although it does adhere to the rotating member, such as to the bristles of a rotating brush, if it is removed with the light oil into a collection trough, the heavier oil tends to clog the trough and to resist flow to the pump removal area. The clogging of the collection trough by the heavier oil also prevents the flow of lighter oil from smoothly proceeding to the pump removal area. This is not satisfactory and, heretofore, a single skimmer could not satisfactorily remove both oils of light and heavier consistencies.

Generally, when the oil introduced into the environment contains oil of lighter and heavier consistencies, two skimmers are used. The first skimmer is used to remove the light oil and the second skimmer is used to remove the heavy oil. The use of two skimmers is expensive and increases the time necessary to deploy the skimmers and remove the oil when time is very important in expediently removing the contaminating oil from the environment.

While it has been proposed to apply steam or other heat to the heavier oil collected in order to improve its flow characteristics and to allow it to be removed with the light oil, the application of steam or other heat requires a steam or heat generator of one type or another located near the area of skimmer deployment. This is expensive and complicated.

SUMMARY OF THE INVENTION

According to one aspect of the invention, there is provided apparatus for removing oil of relatively heavier and relatively lighter viscosities from a body of water, said apparatus comprising at least one rotating member to which said oil of relatively lighter and relatively heavier viscosities adheres, at least two oil removal members to remove said oil of relatively heavier and relatively lighter viscosities from said rotating member at different locations, a collection area to collect said oil of relatively heavier and relatively lighter viscosities removed from said rotating member and a pump to remove said collected oil from said collection area.

According to a further aspect of the invention, there is provided apparatus for removing oil of relatively heavier and relatively lighter consistencies from a body of water, said apparatus comprising at least one rotating member to which said oil or relatively lighter and relatively heavier viscosities adheres, at least two oil removal members to remove said oil of relatively heavier and relatively lighter viscosities from said rotating member, a collection area to collect said oil of relatively heavier and relatively lighter consistencies removed from said rotating member and collected by interconnected first and second collection members located at each respective one of said oil removal members and a pump to remove said oil from said collection area.

According to yet a further aspect of the invention, there is provided a method of removing oil of relatively heavier and relatively lighter viscosities from a body of water, said method comprising collecting said oil of relatively heavier and relatively lighter viscosities from said body of water on at least one rotating member and removing said oil of relatively heavier and relatively lighter viscosities from said at least one rotating member at two different locations.

According to still yet a further aspect of the invention, there is provided a method of removing oil of relatively heavier and relatively lighter viscosities from a body of water, said method comprising providing relative movement between said oil and the entranceway to a rotating member, said relative movement allowing said oil to move in the same direction as the circumference of said rotating member where said oil begins to adhere to said rotating member, removing said adhered oil from said rotating member at least two separate locations by respectively located oil removal members, one at each of said locations, collecting said removed oil at each of said oil removal locations and transporting said collected and removed oil to a collection area, said collected and removed oil being removed from said collection area by a pump.

According to yet a further aspect of the invention, there is provided apparatus for removing oil of relatively heavier and relatively lighter consistencies from a body of water, said apparatus comprising at least one rotating member to which said relatively lighter and relatively heavier oil adheres, at least two oil removal members to remove said relatively heavier and relatively lighter oil from said rotating member at different locations, a collection area to collect said oil of relatively heavier and relatively lighter consistencies removed from said rotating member and a pump to remove said oil from said collection area.

According to a further aspect of the invention, there is provided apparatus for removing oil of relatively heavier and relatively lighter consistencies from a body of water, said apparatus comprising at least one rotating member being a rotating brush having bristles to which said relatively lighter and relatively heavier oil adheres, at least two oil removal members being fingers to remove said relatively heavier and relatively lighter oil from said bristles of said rotating brush, a collection area to collect said oil of relatively heavier and relatively lighter consistencies removed from said bristles of said rotating brush and collected by interconnected first and second collection members located at each of said oil removal members and a pump to remove said oil from said collection area.

According to yet a further aspect of the invention, there is provided a method of removing oil of relatively heavier and relatively lighter consistencies from a body of water, said method comprising collecting said oil of relatively heavier and relatively lighter consistencies from said body of water on at least one rotating member and removing said oil of relatively heavier and relatively lighter consistencies from said at least one rotating member at two different locations.

According to yet a further aspect of the invention, there is provided a method of removing oil of relatively heavier and relatively lighter consistencies from a body of water, said method comprising providing relative movement between said oil and the entranceway to a rotating brush, said relative movement allowing said oil to move in the same direction as the circumference of said rotating brush having bristles where said oil begins to adhere to said bristles of said rotating brush, removing said adhered oil from said rotating brush at least two separate locations by respective oil removal members, one at each of said locations, collecting said removed oil at each of said oil removal locations and transporting said collected and removed oil to a single collection area, said collected and removed oil being removed from said single collection area by a pump.

According to still yet a further embodiment of the invention, there is provided apparatus for removing oil blockages from the entranceway of a skimmer, said apparatus comprising a rake pivotally connected to said skimmer and being operable to move outwardly, inwardly and rotationally relative to said skimmer, said rake including a plurality of prongs which are extendible into and out of water and which prongs are operable to move said oil blockages into contact with a rotatable member on said skimmer which rotatable member is used to collect said oil blockages.

According to still yet a further aspect of the invention, there is provided a method to facilitate removal of oil blockages which block the entranceway to a rotatable member of an oil skimmer, said method comprises operating a rake having tines which rake is pivotally and rotatably connected to said oil skimmer, said method comprising extending said tines of said rake outwardly of said skimmer in the vicinity of the entranceway of said skimmer and in the area of said oil blockages and moving said tines and said oil blockage towards said entranceway so that said oil blockages are moved into said entranceway and into contact with a rotatable oil carrying member of said oil skimmer.

BRIEF DESCRIPTION OF THE SEVERAL VIEWS OF THE DRAWINGS

Specific embodiments of the invention will now be described, by way of example only, with the use of drawings in which:

FIGS. 1A, 1B and 1C are diagrammatic isometric views of an oil skimmer according to the invention with the skimmer of FIG. 1B shown in partially exploded condition;

DESCRIPTION OF SPECIFIC EMBODIMENT

Figure 1A:
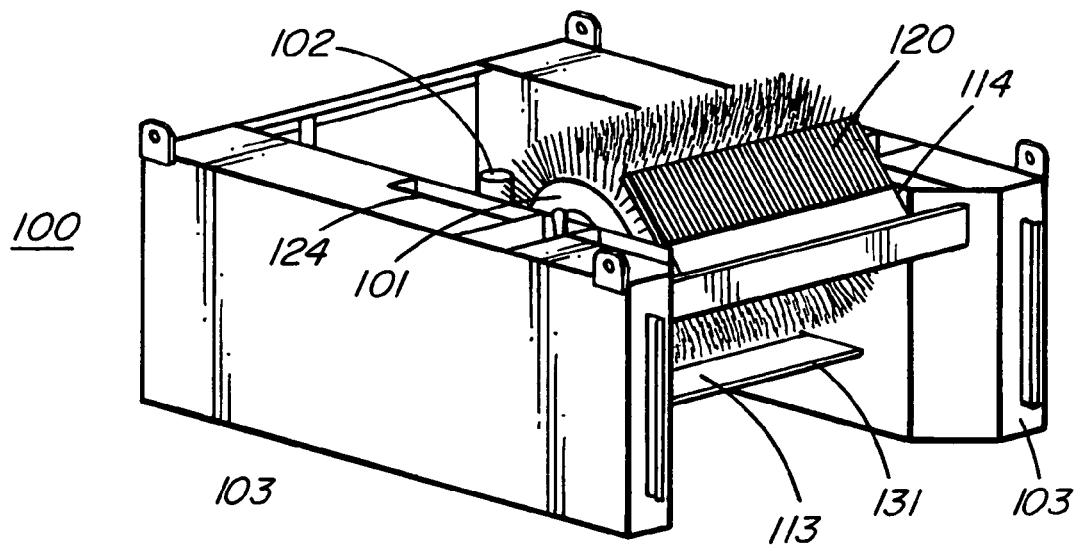
Figure 1B:
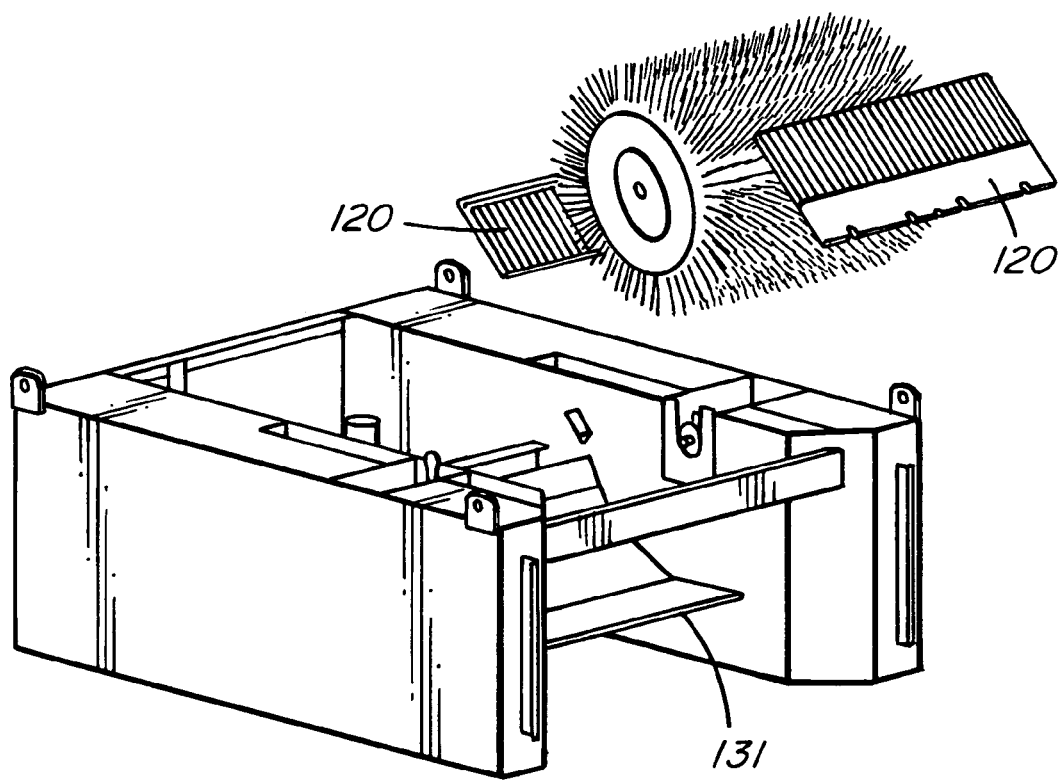

Referring now to the drawings, an oil skimmer according to the invention is illustrated generally at 100 in FIG. 1. The oil skimmer 100 includes a rotating member, conveniently a rotating brush 101 mounted for clockwise movement as shown in FIG. 3, a pump 102 (also seen in FIGS. 3 and 4) which is intended to be quickly connected to and disconnected from an oil removal conduit (not illustrated) which conveys the oil removed from the rotating brush 101 to a storage location, pontoons 103 on both sides of the rotating brush 101 which provide buoyancy for the skimmer 100 under operating conditions and a collection trough system generally illustrated at 104 (FIG. 3) used to collect the oil from a first oil removal location 110 and from a second removal location 114.

The rotating member which is a rotating brush 101 in a first embodiment is made from a polyethylene plastic material to provide durability and comprises a large number of bristles 105 which contact the oil during the rotation of the brush 101. The oil entering the skimmer 100 is shown at 111 in FIG. 3 as being on and under the surface of the water 112. The oil 111 moves into the entranceway 113 of the oil skimmer 100. A motor 115, conveniently a hydraulic powered motor, is used to power the rotating brush 101.

The second oil removal location 114 is likewise used to remove oil from the rotating brush 101 such that oil may be removed from the brush at both the first location and second locations 110, 114, respectively. Each of the locations 110, 114 includes a finger member 120, shown more clearly in FIGS. 1 and 4, which finger member 120 is made from a plastic material for durability. Each finger member 120 includes a plurality of fingers 121 (FIG. 4), each of the fingers 121 tapering so that the space between adjacent fingers 121 squeezes the brush bristles 105 as the brush 101 rotates and the bristles 105 pass between the fingers 121. During operation, the fingers 121 extend into the rotating brush 101 as seen in FIGS. 3 and 4 so that the fingers 121 physically contact the bristles 105 of the rotating brush 101 during operation of the skimmer 100.

Figure 2:
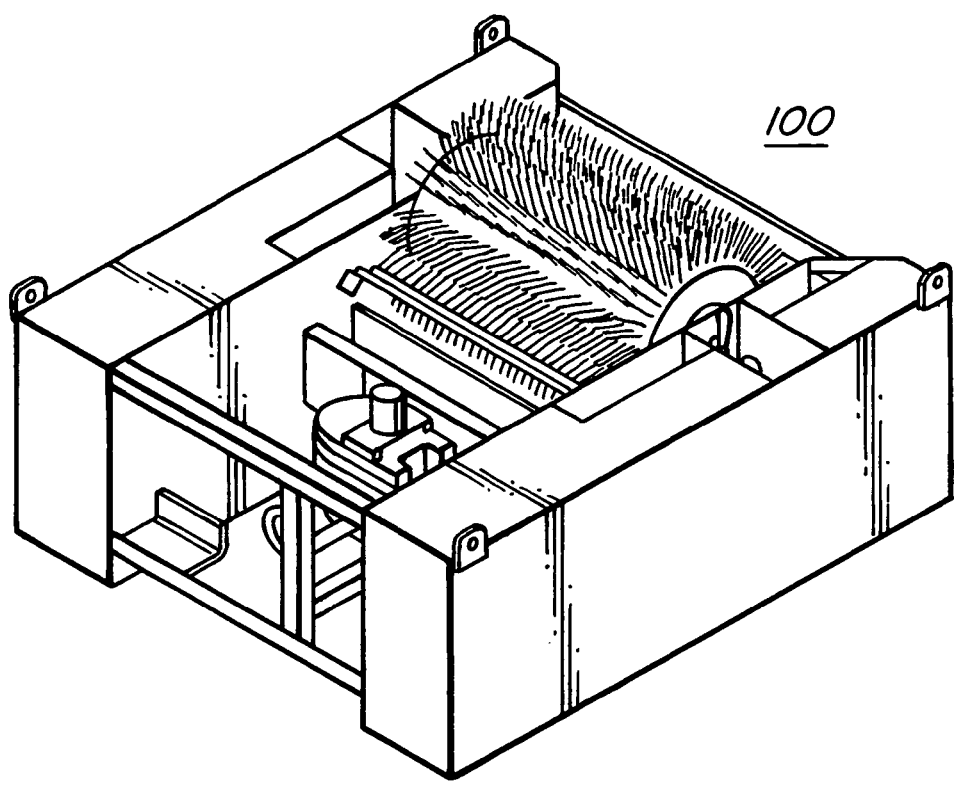
FIG. 2 is a diagrammatic side partially sectional view of the oil skimmer of FIG. 1 particularly illustrating the flow of the oil collected by the skimmer.
Figure 2:
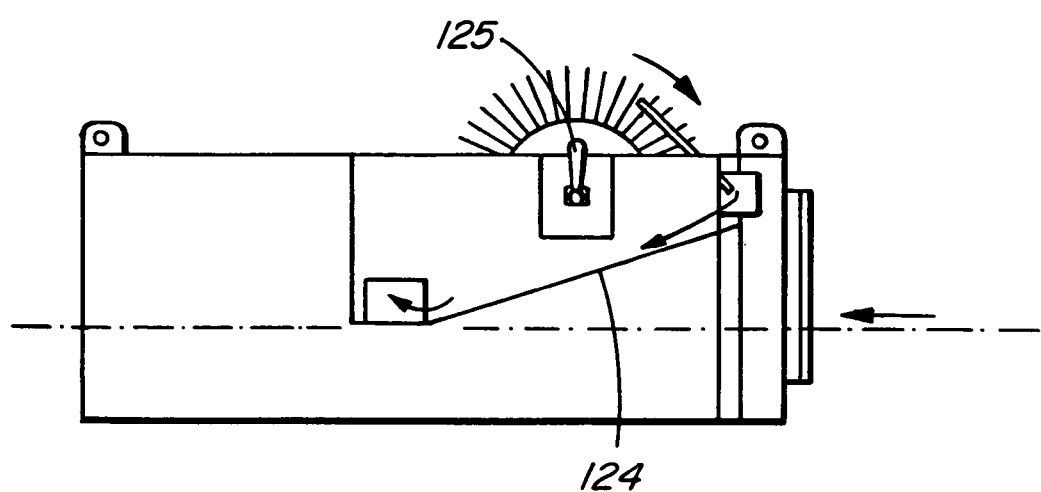
Figure 3:
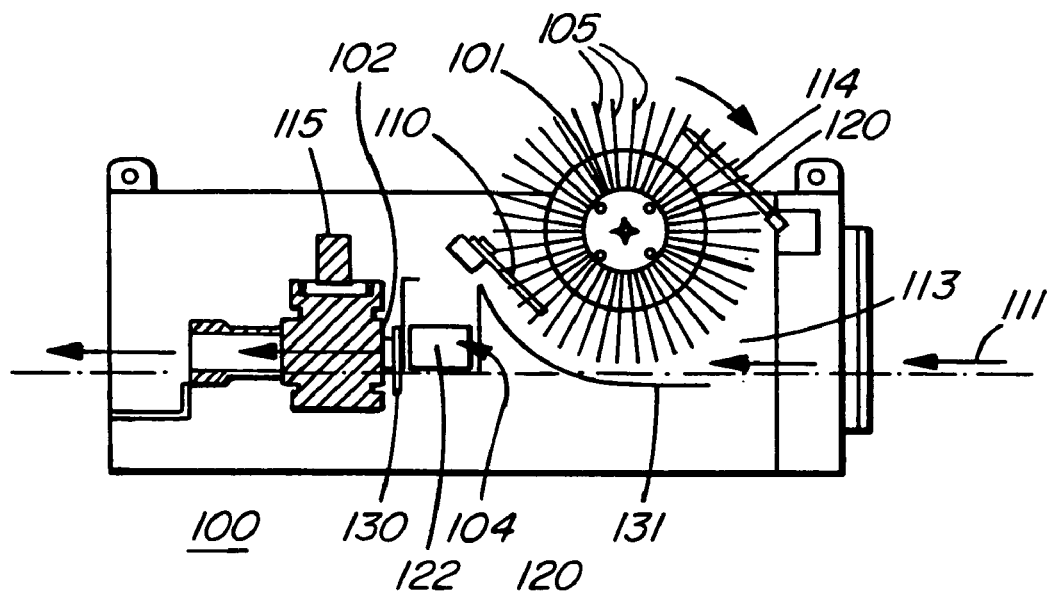
FIG. 3 is a diagrammatic side view of the oil skimmer of FIGS. 1 and 2 and particularly illustrating the two oil removal locations on the rotating brush and further illustrating the oil diffuser plate used to increase the efficiency of oil skimming.
Figure 4:
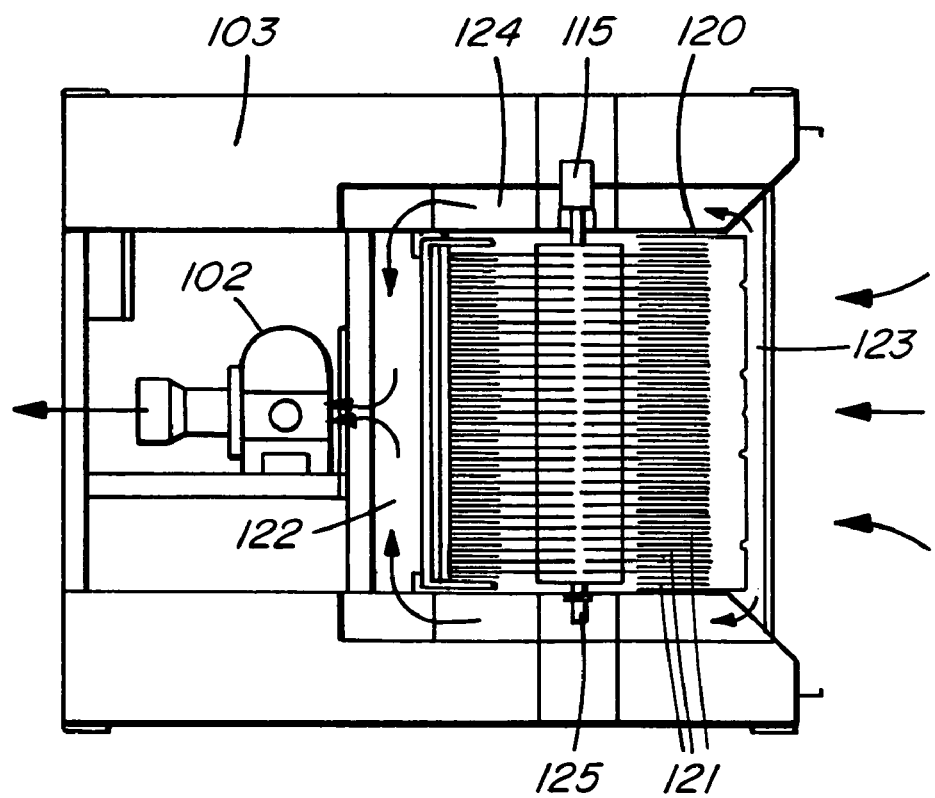
FIG. 4 is a diagrammatic plan view of the oil skimmer particularly illustrating the oil flow which is collected from the water and passes through the skimmer.
Figure 5:
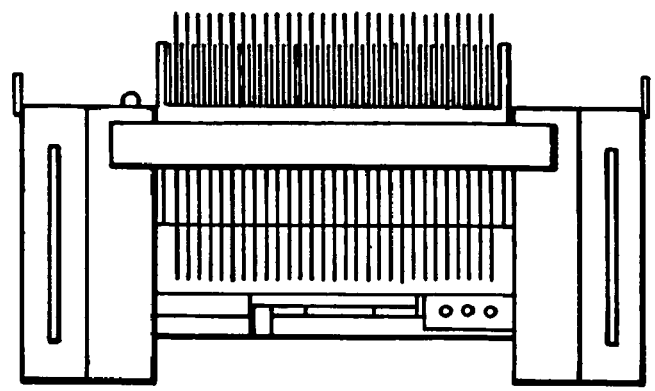
FIG. 5 is a diagrammatic front view of the oil skimmer of FIG. 1 particularly illustrating the wedge shaped finger members used to remove the oil from the brush.

The oil collection trough system 104 has three (3) principal collection and conveying areas (FIGS. 3 and 4). A first collection area 122 provides collection for the oil removed from first oil removal location 110. A second collection area 123 provides collection for the oil removed from the second oil removal location 114 and a third conveying area 124 (FIGS. 1 and 4) provides an open trough which slants downwardly as best seen in FIG. 2 from second oil collection area 123 to first oil collection area 122 and runs along both sides of the rotating brush 101 adjacent the side pontoons 103 all as best seen in FIG. 4. The collection and conveying areas 122, 123, 124 are open when viewed in plan such that debris other than oil which enters the skimmer 100 and finds itself within the collection and conveying areas 122, 123, 124 can be readily and manually removed. The collection and conveying areas 122, 123, 124 take the form of troughs as seen in FIGS. 2, 3 and 4. An opening 130 (FIG. 3) is provided in the lowermost area of collection area 122 to allow access between the collection area 122 and the inlet of the pump 102.

A diffuser plate 131 (FIG. 3) is positioned below the rotating brush 101 as illustrated in FIG. 3. The diffuser plate 131 prevents bottom waves from interfering with oil removal by the skimmer 100 and increases the efficiency of the oil removal operation. It happens in bodies of water with shallow depths such as streams and in areas close to the shore, that the action of the rotating brush 101 creates a wave which bounces off the bottom of the body of water and produces turbulence or rough water around the entranceway 113 to the skimmer 100. This can prevent oil from smoothly entering the skimmer 100. The use of a diffuser plate 131 blocks the wave reflected from the bottom and prevents the wave from interfering with the entrance of oil into the entranceway 113 to the skimmer 100.

An additional operating characteristic of the diffuser plate 131 is that the plate 131 tends to bring or "drive" the oil into contact with the rotating brush 101 and to assist the adherence of the oil to the brush 101 in the initial area of contact 113 (FIG. 3) between the oil and the rotating brush 101.

OPERATION

In operation, it will be assumed that there is a body of water contaminated with oil which has resulted from an oil spill and that it is desired to remove the oil from the water. It will further be assumed that the oil which has been introduced into the water by way of an oil spill including both heavier and lighter oil. Such a spill, for example, might have taken place when a train has derailed adjacent to a lake and the tanker cars which have derailed and which have spilled crude oil into the lake which crude oil contains a combination of lighter and heavier oils. Light oils such as diesel, kerosene and the like and heavy oils such as bitumen, tars, wax, etc. may be carried in different rail cars and, in the event of a derailment, oils of mixed viscosities may be present in the water.

The skimmer 100 will be deployed to the area of oil contamination or oil spill and will be introduced into the body of water containing the spilled oil. A connection, conveniently from an adjacent boat (not illustrated) or from shore to the pump 102 is made to provide a conduit for the oil being pumped from the pump 102 of the skimmer 100 with the end remote from the skimmer 100 being connected to a storage location. A second connection (not illustrated) is likewise provided to allow hydraulic fluid to power the motor 115 (FIG. 4) used to rotate the brush 101.

The rotation of the brush 101 will commence by initiating operation of hydraulic motor 115. The rotating brush 101 is intended to be conveniently rotated in a clockwise direction as viewed in FIG. 3 and induces an artificial current within the water in which the skimmer 100 is deployed. This current will allow the water and oil 111 to smoothly enter the entranceway 113 of the skimmer 100 and to proceed to the brush 101. If the brush 101 was rotated in a counterclockwise direction, a wave would be created near the entranceway 113 which wave would tend to push the oil away from the entranceway 113 and hinder the efficiency of the oil removal process.

As the oil 111 enters the skimmer 100, the oil adheres to the bristles 105 of the brush 101 as the rotating brush 101 moves clockwise as seen in FIG. 2. The diffuser plate 131 will tend to bring the oil on the water surface into contact with the bristles 105 of the brush 101. As the rotating brush 101 initially moves past the first oil removal location 110, the bristles 105 to which the oil is adhering contact the fingers 121 of the finger member 120 and the heavier oil is stripped from the bristles 105 and falls into the first oil collection area or trough 122. The rotating brush 101 continues to rotate with most of the heavier oil removed and when it reaches the second oil removal location 114, the light oil, if present, is similarly stripped from the bristles 105 of the brush 101 by the fingers 121 of the finger member 120 and by the wedging action between the bristles 105 and the tapered fingers 121 of the finger member 120 and such lighter oil falls into the second oil collection area or trough 123.

The light oil falling into the second collection area or trough 123 flows readily and it passes under gravity from the second collection area or trough 122 along both sides of the skimmer 100 in conveying area or trough 124 downwardly to the first collection area or trough 122. A head of collected oil will be building up in first collection area 122 and the collected oil will flow through rectangular opening 130 to pump 102 where the collected oil is then removed to a nearby boat or to the shore where the oil is stored and subsequently disposed of or recycled.

It will be appreciated that although the skimmer 100 has been described as being used for the removal of oil of both lighter and heavier viscosities, the absence of oils of both viscosities together and the existence of oil of only a single viscosity will still allow the use of the skimmer 100 according to the invention. For example, if only oil of heavy viscosity is present, the majority of such oil is removed at the first removal location 110. If oil is present of lighter viscosity only, the majority of oil is removed at the second location 120 and if both types of oil are present, the oils are removed at both the first location 110 and second location 120.

Figure 6A:
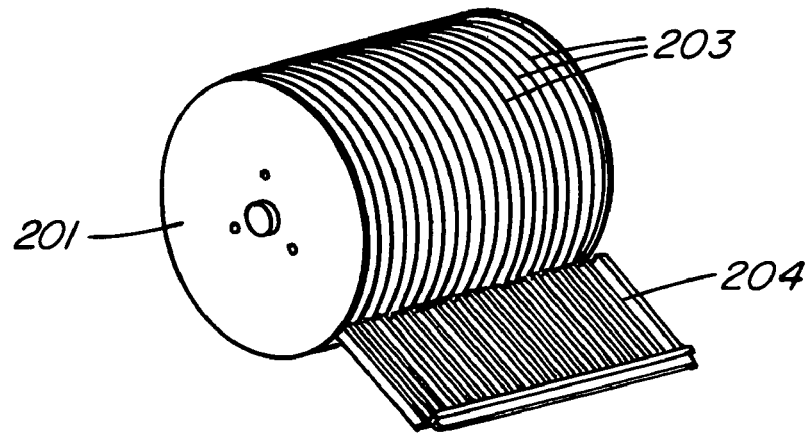
FIGS. 6A and 6B are diagrammatic views of a disk and drum skimmer, respectively, which are replacement members for the rotating brush of FIG. 1.
Figure 6B:
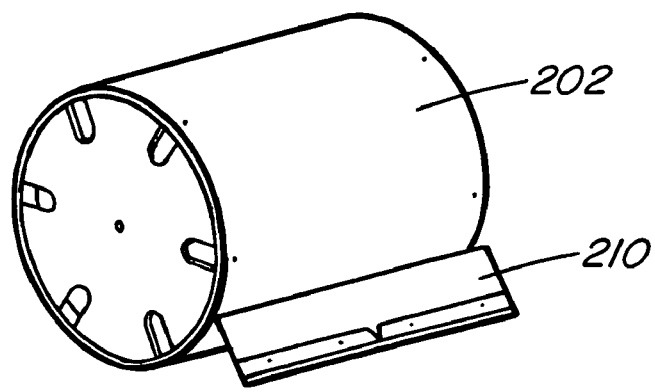

While the rotating member of the skimmer 100 is conveniently a rotating brush 101 with its concomitant bristles 105, it is contemplated that the rotating brush 101 may be quickly replaced with a disk member 200 (FIG. 6A) under various operating conditions. The disk member 201 comprises a series of disks 203 which are individually wiped by a plurality of individual pieces of flexible polyethylene material sheeting 204 which contact the disks 203 and remove the oil adhering thereto. Such a disk member 201 is known in the art and has the advantage that the quantity of water brought into the skimmer 100 which otherwise would adhere to the rotating brush 101 is reduced in applications where there is a thin oil surface on the water and the light oil only is being removed from the water surface. Likewise, it is contemplated that the rotating brush 101 could be replaced with a cylinder member or rotating drum 202 (FIG. 6B) to which oil adheres and which adhered oil is removed by a scraper 210 in contact with or in close proximity to the cylinder 202. The disk and drum embodiments may be implemented manually without tools by a simple replacement operation using quick change pivot connection 125 (FIGS. 2 and 4) which is brought into and out of contact with the drum 202, the disk member 201 and the rotating brush 101, as the operator may desire.

While a single rotating brush member 101 has been disclosed, it is contemplated that another rotating brush or rotating member such a disk member or rotating cylinder may be mounted on the skimmer 100 is a position opposite to and a mirror image of rotating brush 101. In this embodiment, the second rotating brush 101 or rotating member will run counter clockwise as the oil is skimmed from the brush 101 or member and is fed into a trough which is likewise accessible to the pump 115.

It is further contemplated that when only heavy oils are present, the skimmer 100 may be modified by the removal of the scraper or finger member 120 at the second oil removal location 114 and, alternatively, if light oil only is being removed, the heavy oil scraper or finger member 110 may be removed. Thus, the skimmer 100 may be used under conditions of heavy and/or light oil being spilled on a water surface and the use of two or more skimmers having different configurations for the different oils being collected will be obviated.

Figure 7A:
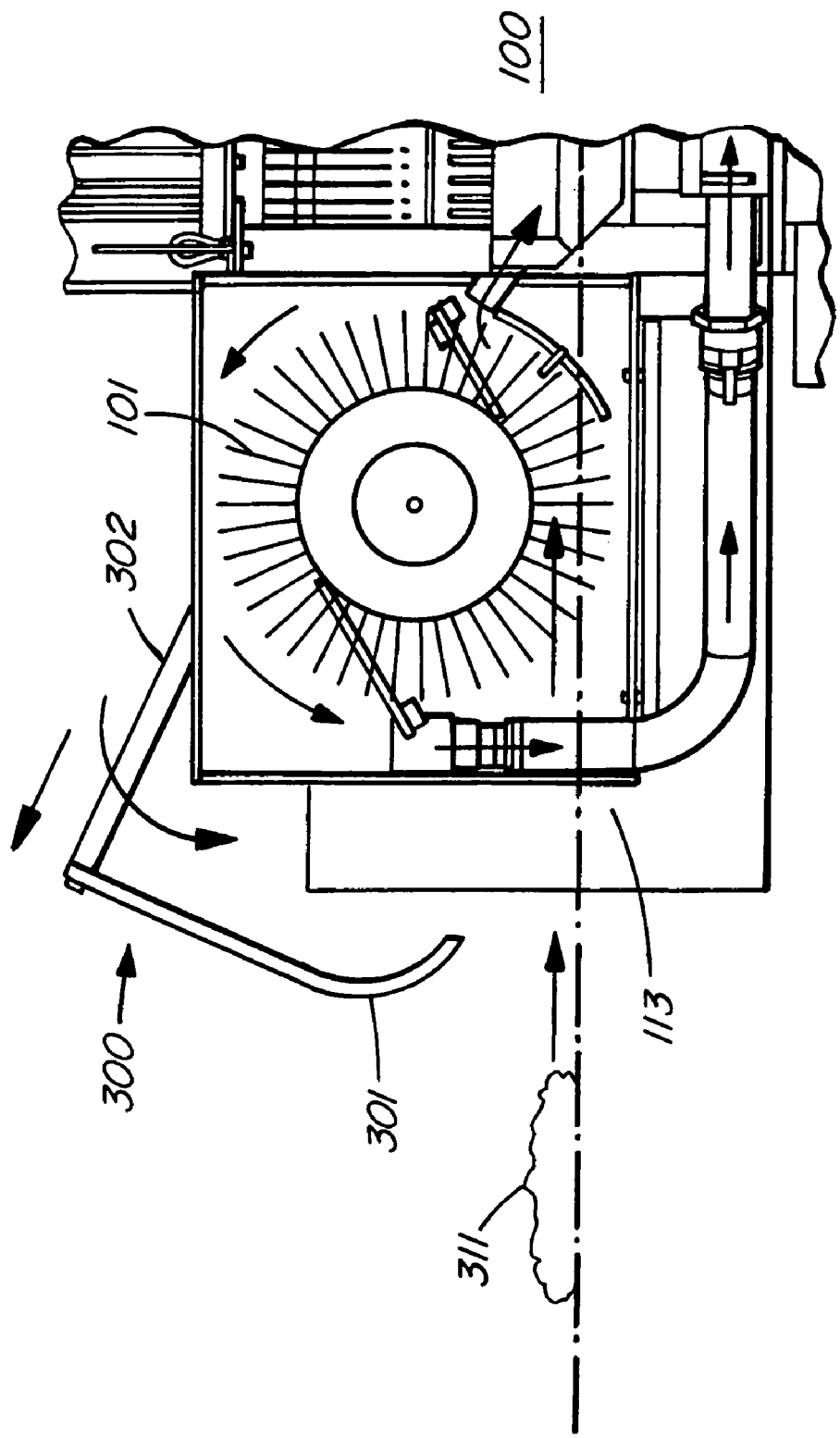
FIGS. 7A and 7B are diagrammatic side and isometric views of the oil skimmer of FIG. 1 with an added rake to assist in oil cleanup according to a further embodiment of the invention.
Figure 7B:
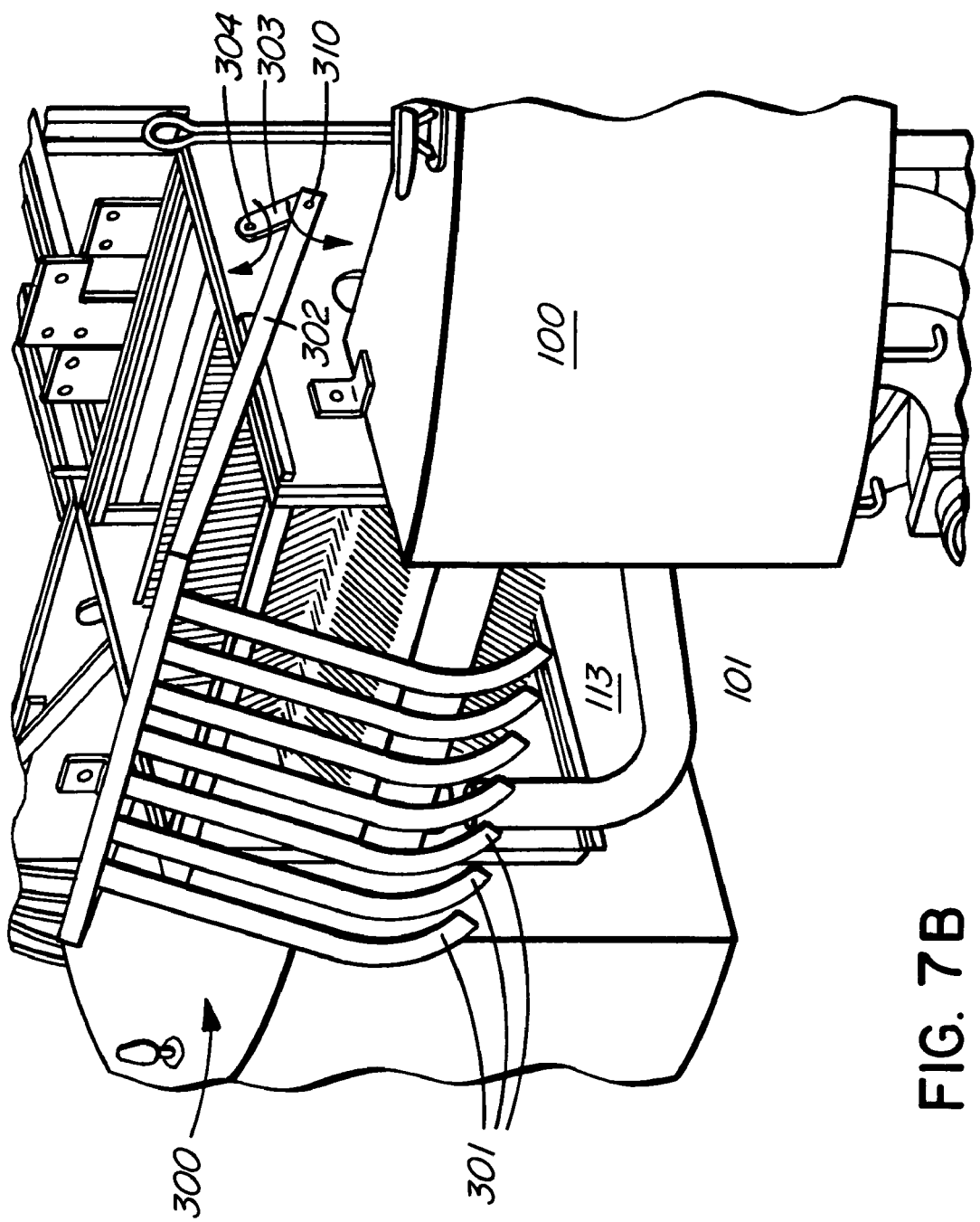

A further embodiment of the invention is illustrated in FIGS. 7A and 7. In this embodiment, a rake generally illustrated at 300 is added to the skimmer 100. The addition of the rake 300 is useful in operations where the oil is of a viscosity and/or waxiness that oil mats are formed on the surface of the water. In such a situation, blockages or "oil jams" near the entranceway 113 can occur thereby reducing the oil flow to the brush or other rotating member 101. The rake 300 includes a plurality of tines or prongs 301. The rake 300 includes a first arm 302 which is pivotally connected to second arm 303 (FIG. 7B) which allows both translational and rotational movement of the rake 300 as indicated by the arrows in FIG. 7A. The rake 300 is hydraulically controlled and may be positioned such that it is not obtrusive and may be in an out of water and out of the way position when the operation of the rake 300 is not required or desired. Thus, the operation of the skimmer 100 is not affected when the rake is not required.

In operation where the oil recovery operations are such that the previously described oil blockages or oil jams are conveniently removed by the rake 300, the user will activate the hydraulic controls (not illustrated) which operate the rake 300. The rake 300 is rotated about pivot 304 so that arm 303 extends the rake 300 translationally or horizontally relative to the skimmer 100. Likewise, the arm 302 moves outwardly or inwardly about pivot 310. The tines or prongs 301 extend outwardly from the skimmer 100 and either pass through the oil blockage or extend into the water a distance from the blockage illustrated diagrammatically at 311 in FIG. 7A. Arm 303 will rotate about pivot 304 in a counter clockwise position as viewed in FIG. 7B and the tines 301 will rake the oil blockage 311 into the skimmer 100 and into contact with the brush 101 thereby facilitating pickup by the brush 101 and removal of the oil blocking the entranceway 113 of the skimmer 100. The controls for the rake 300, while being particularly usefully hydraulically controlled, could be controlled pneumatically or electrically as well. Indeed, the rake 300 might be manually operated by the user when it is needed only infrequently.

Many further modifications beyond those described herein will readily occur to those skilled in the art to which the invention relates and the specific embodiments described should be taken as examples of the invention only and not as limiting the scope of the invention as defined in accordance with the accompanying claims.

We claim:

1. Apparatus for removing oil of relatively heavier and relatively lighter viscosities from a body of water, said apparatus comprising at least one rotating member to which said oil of relatively lighter and relatively heavier viscosities adheres, at least two oil removal members operably mounted on and associated directly with said one rotating member to separately remove said oil of relatively heavier and relatively lighter viscosities from said rotating member at different locations, a collection area to collect said oil of relatively heavier and relatively lighter viscosities removed from said one rotating member and a pump to remove said collected oil from said collection area.

2. Apparatus as in claim 1 wherein said one rotating member is a brush having bristles and said oil adheres to said bristles of said brush.

3. Apparatus for removing oil of relatively heavier and relatively lighter consistencies from a body of water, said apparatus comprising at least one rotating member to which said oil of relatively lighter and relatively heavier viscosities adheres, at least two oil removal members to separately remove said oil of relatively heavier and relatively lighter viscosities from said one rotating member, a collection area to collect said oil of relatively heavier and relatively lighter consistencies removed from said one rotating member and collected by interconnected first and second collection members located at each respective one of said oil removal members and a pump to remove said oil from said collection area.

4. A method of removing oil of relatively heavier and relatively lighter viscosities from a body of water, said method comprising collecting said oil of relatively heavier and relatively lighter viscosities from said body of water on at least one rotating member and separately removing said oil of relatively heavier and relatively lighter viscosities from said at least one rotating member at two different locations on said one rotating member.

5. A method of removing oil of relatively heavier and relatively lighter viscosities from a body of water, said method comprising providing relative movement between said oil and the entranceway to a first rotating member, said relative movement allowing said oil to move in the same direction as the circumference of said first rotating member where said oil begins to adhere to said first rotating member, removing said adhered oil from said first rotating member at at least two separate locations on said first rotating member by respectively located oil removal members, one at each of said locations on said first rotating member, one of which removes said heavier oil and one of which removes said lighter oil, collecting said removed oil at each of said oil removal locations on said first rotating member and transporting said collected and removed oil to a collection area, said collected and removed oil being removed from said collection area by a pump.

6. Apparatus for removing oil of relatively heavier and relatively lighter consistencies from a body of water, said apparatus comprising at least one rotating member to which said relatively lighter and relatively heavier oil adheres, at least two oil removal members to separately remove said relatively heavier and relatively lighter oil from said one rotating member at different locations on said one rotating member, a collection area to collect said oil of relatively heavier and relatively lighter consistencies removed from said rotating member by said at least two oil removal members on said one rotating member and a pump to remove said oil from said collection area.

7. Apparatus as in claim 6 wherein said collection area comprises a first collection member to collect said heavier oil removed from a first of said different locations and a second collection member to collect said lighter oil removed from a second of said different locations.

8. Apparatus as in claim 7 wherein said second collection member is connected to said first collection member by a conduit.

9. Apparatus as in claim 8 wherein said first and second collection members are troughs and said conduit connects said troughs.

10. Apparatus as in claim 9 wherein said troughs and said conduit are exposed to the atmosphere at the top of said troughs and said conduit.

11. Apparatus as in claim 6 wherein said one rotating member is a brush having bristles and said at least two oil removal members are fingers which extend into said brush and contact said bristles.

12. Apparatus as in claim 9 and further comprising a diffuser plate located beneath said one rotating member.

13. Apparatus as in claim 12 and further comprising an entranceway for said oil, said one rotating member rotating in a direction such that the circumference of said one rotating member moves said oil into contact with said diffuser plate beneath said one rotating member.

14. Apparatus as in claim 6 and further comprising a rake pivotally connected to said skimmer and operable to extend into said water and to move outwardly, inwardly and rotationally relative to said skimmer.

15. Apparatus as in claim 14 wherein said rake further includes prongs or tines, said prongs or tines being movable between positions within and without of said water.

16. Apparatus as in claim 15 wherein said rake is moved by hydraulically operated controls.

17. Apparatus for removing oil of relatively heavier and relatively lighter consistencies from a body of water, said apparatus comprising at least one rotating member being a first rotating brush having bristles to which said relatively lighter and relatively heavier oil adheres, at least two oil removal members associated with and operably mounted on said first rotating brush, said at least two oil removal members being fingers to separately remove said relatively heavier and relatively lighter oil from said bristles of said first rotating brush, a collection area to collect said oil of relatively heavier and relatively lighter consistencies removed from said bristles of said first rotating brush and collected by interconnected first and second collection members located at each of said at least two oil removal members and a pump to remove said oil from said collection area.

18. A method of removing oil of relatively heavier and relatively lighter consistencies from a body of water, said method comprising collecting said oil of relatively heavier and relatively lighter consistencies from said body of water on a first rotating member and removing said oil of relatively heavier and relatively lighter consistencies from said first rotating member separately at two different locations on said first rotating member.

19. Method as in claim 18 wherein said first rotating member is a brush having bristles and said oil of heavier and lighter consistencies is removed at said two different locations on said brush by respective finger members extending into said brush and contacting said bristles.

20. Method as in claim 18 wherein said oil collected from said first rotating member at said two different locations is collected at a single oil collection location.

21. Method as in claim 20 wherein said oil collected into said single oil collection location is removed from said single oil collection location by a pump.

22. Method as in claim 21 wherein said two different locations on said first rotating member are connected by a conduit.

23. Method of removing oil of relatively heavier and relatively lighter consistencies from a body of water, said method comprising providing relative movement between said oil and the entranceway to a first rotating brush, said relative movement allowing said oil to move in the same direction as the circumference of said first rotating brush, said first rotating brush having bristles where said oil begins to adhere, removing said adhered oil from said bristles of said rotating brush at at least two separate locations on said first rotating brush by respective oil removal members operably mounted on said first rotating brush, one at each of said locations, one of which removes said heavier oil and one of which removes said lighter oil, collecting said removed oil at each of said oil removal locations on said first rotating brush and transporting said collected and removed oil to a single collection area, said collected and removed oil being removed from said single collection area by a pump.

* * * * *